US012592041B2

(12) United States Patent
Lyons et al.

(10) Patent No.: US 12,592,041 B2
(45) Date of Patent: Mar. 31, 2026

(54) MIXED SHEET EXTENSION

(71) Applicant: Siemens Industry Software Inc.,
Plano, TX (US)

(72) Inventors: Alex Lyons, Cambridge (GB); Timothy Case, Milford, OH (US); Richard Collins, Cambridge (GB); Peter Nanson, Cambridge (GB)

(73) Assignee: Siemens Industry Software Inc.,
Plano, TX (US)

( * ) Notice: Subject to any disclaimer, the term of this patent is extended or adjusted under 35 U.S.C. 154(b) by 194 days.

(21) Appl. No.: 18/568,680

(22) PCT Filed: Jun. 17, 2021

(86) PCT No.: PCT/US2021/037777
§ 371 (c)(1),
(2) Date: Dec. 8, 2023

(87) PCT Pub. No.: WO2022/265637
PCT Pub. Date: Dec. 22, 2022

(65) Prior Publication Data
US 2024/0212281 A1      Jun. 27, 2024

(51) Int. Cl.
*G06T 17/20*          (2006.01)
(52) U.S. Cl.
CPC ..................................... *G06T 17/20* (2013.01)
(58) Field of Classification Search
CPC .......... G06T 17/20; G06T 15/005; G06T 7/90
See application file for complete search history.

(56) References Cited

U.S. PATENT DOCUMENTS

| 2018/0101982 A1* | 4/2018 | Kling | G06T 17/20 |
| 2019/0130058 A1* | 5/2019 | Thomas | G06F 30/15 |
| 2020/0273248 A1* | 8/2020 | Jørgensen | G06T 17/205 |

OTHER PUBLICATIONS

Ferrari, Giacomo, et al. "An extended B-Rep solid modeling kernel integrating mesh and NURBS faces." Computer-Aided Design and Applications 15.5 (2018): 697-706.
Liu, Yu-Shen, et al. "Mesh blending." The Visual Computer 21 (2005): 915-927.

(Continued)

*Primary Examiner* — Michelle Chin
(74) *Attorney, Agent, or Firm* — Lempia Summerfield Katz LLC

(57) ABSTRACT

A computer-implemented method of extending a mixed sheet within a B-rep model is described. The mixed sheet includes surfaces having different geometries, such as a mesh positioned between first and second classical geometry surfaces. A first guide curve is defined, located at the boundary of a first surface for a length corresponding to the desired mixed sheet extension adjacent the first surface. A second guide curve may also be defined, located at the boundary of a second surface for a length corresponding to the desired mixed sheet extension adjacent the second surface. At least one extension mesh rung is created by generating facets between the two external mesh vertices using first and second extension vectors, wherein the first extension vector has a pre-determined spatial relationship to the first guide curve. If included, the second extension vector has a pre-determined spatial relationship to the second guide curve.

18 Claims, 6 Drawing Sheets

(56) References Cited

OTHER PUBLICATIONS

Mukherjee, Nilanjan, et al. "Automatic hexahedral sweep mesh
generation of open volumes." Proceedings of the 21st International
Meshing Roundtable. Springer Berlin Heidelberg, 2013. pp. 1-20.
International Search Report for International Application No. PCT/
US2021/037777 filed Jun. 17, 2021.
Kraevoy Vladislav et al;:"Template-Based Mesh Completion";
Eurographics Symposium on Geometry Processing (2005), Univer-
sity of British Columbia, pp. 1-10.

* cited by examiner

FIG 5

MIXED SHEET EXTENSION

The present patent document is a § 371 nationalization of PCT Application Serial No. PCT/US2021/037777, filed Jun. 17, 2021, designating the United States, which is incorporated by reference in its entirety.

TECHNICAL FIELD

The present disclosure relates to a computer-implemented method of extending a mixed sheet including at least one mesh and one alternative geometry surface in a mixed-geometry model, wherein the mesh boundary to be extended includes a row of n facets separated by n−1 interior vertices and located between two external mesh vertices, in particular where one or both of the external mesh vertices is adjacent to a surface having a different geometry to the mesh.

BACKGROUND

Computer-Aided Design (CAD) systems are used commonly in many fields of engineering, manufacturing, and design to create and manipulate solid modelling representations of objects. Boundary representation (B-rep) technology dominates CAD modelling. The B-rep technology provides an efficient and adaptable representation of parts by combining classic geometry: analytic surfaces and curves, non-uniform rational basis spline (NURBS) and procedural surfaces and curve; with topology, which captures the connectivity and interaction between geometric elements. CAD modelling may need to combine different types of surfaces to achieve various modelling requirements. For example, it may be necessary to extend a set of adjacent surfaces, such as those including facet geometry (meshes) and those having a classic geometry (parameterized or implicit geometry) to fill a gap or as a basis for subsequent modelling operations. Surfaces including different geometries on the whole extend differently, which for sharp interfaces involves the geometry of the extended edge being defined by the intersection of the two surface extensions, but where an edge is smooth or near smooth, this intersection is not well-defined. If the adjacent mesh and classical geometry surfaces are extended separately, the edges between the surfaces may split apart and no longer be capable of representing the boundary between both extended surfaces.

Existing modelling systems have tended to solve the problem of extending mesh and classical geometry surfaces separately, and only one type of geometry is used at once. However, there are situations where being able to use mixed geometries may be desirable and useful, such as extending mixed geometry boundaries simultaneously, or using a mesh for space filling between two classical geometry surfaces following the deletion of a feature. Furthermore, if it were possible to utilize such mixed geometry boundaries without the risk of splitting apart, the technique may be utilized on smooth or near smooth edges.

SUMMARY

The scope of the present disclosure is defined solely by the appended claims and is not affected to any degree by the statements within this summary. The present embodiments may obviate one or more of the drawbacks or limitations in the related art.

The present disclosure aims to address these issues by providing, in a first aspect a computer-implemented method of extending a mixed sheet including at least one mesh and one alternative geometry surface in a mixed-geometry model, wherein the mesh boundary to be extended includes a row of n facets separated by n−1 interior vertices and located between two external mesh vertices, and wherein at one or both of the external mesh vertices is adjacent to a surface having a different geometry to the mesh. The method includes: defining a first guide curve located at the boundary of the first surface for a length corresponding to the desired mixed sheet extension adjacent the first surface; and creating at least one extension mesh rung by generating facets between the two external mesh vertices using first and second extension vectors, wherein the first extension vector has a pre-determined spatial relationship to the first guide curve.

By utilizing a system of guide curves and rungs, it is possible to carry out a mixed sheet extension in a mixed modelling system without risking the splitting apart of edges between faces and surfaces having different geometries. When used in a B-rep modelling system, not only is it possible to extend faces across a set of selected edges in order to join multiple sheet bodies together as part of an extend-and-trim sheet modelling workflow, but to heal a wound resulting from the deletion of a set of selected faces, by extending the faces adjacent to the wound.

The method may further include defining a second guide curve located at the boundary of the second surface for a length corresponding to the desired mixed sheet extension adjacent the second surface, wherein the second extension vector has a pre-determined spatial relationship to the second guide curve.

The pre-determined spatial relationship may include the first extension vector laying at an angle α to a tangent of the first guide curve and the second extension vector laying at an angle β to a tangent of the second guide curve, wherein the directions of the first and second extension vectors may be guided by the first and second guide curves, respectively.

In this case, the n−1 interior mesh vertices may be extended along the mesh rung by n−1 interpolated mesh vectors, wherein facets are generated along the interpolated mesh vectors, and the angle of each interpolated mesh vector to its corresponding interior mesh vertex is a weighted average of α and β. The weighting may be determined by the distance of the interpolated extension vector from each of the first and second extension vectors.

The first guide curve and the second guide curve may be divided into an equal number of rungs. The number of rungs may be determined by the quality of the mesh. Alternatively, the number of rungs may be determined by a pre-determined tolerance between the first extension vector and the first guide curve and a pre-determined tolerance between the second extension vector and the second guide curve.

For a guided extension vector, either α or β may equal 0° such that the first extension vector and the second extension vector are guided by the first and second guide curves, respectively.

The sheet may be extended as part of a sheet extend operation or the sheet may be extended as part of a face delete operation.

At least a third guide curve may be provided at one of the interior mesh vertices, and the corresponding interpolated extension vector may lie at an angle γ to a tangent of the third guide curve.

Both of the first and the second external mesh vertices may be adjacent to a surface having a different geometry to the mesh.

The first and second surfaces may be classical geometry surfaces. Alternatively, the mesh may include facets having a first regular polygonal shape and the first and/or the second surface includes a mesh of facets may have a second, different polygonal shape.

In a second aspect, the present disclosure also provides a computer program containing instructions, which, when compiled on a computer, cause the computer to carry out the method described herein.

BRIEF DESCRIPTION OF THE DRAWINGS

The present disclosure is now described by way of example only, and with reference to the accompanying drawings, in which:

FIG. 5 is a flow chart illustrating a method of extending a mixed sheet in accordance with an embodiment.

DETAILED DESCRIPTION

The present disclosure offers the ability to use a mixed geometry model in which it is possible to extend surfaces having different geometries without the risk of the edges between them splitting. Within a mixed-geometry model, a sheet including at least one mesh and one alternative geometry surface, wherein the mesh boundary to be extended includes a row of n facets separated by n−1 interior vertices is located between two external mesh vertices. One or both of the external mesh vertices is adjacent to a surface having a different geometry to the mesh. The different geometry surface may be a classical geometry surface but may alternatively be a mesh having a different polygonal facet structure. To begin with, a first guide curve is generated, located at the boundary of the first surface and for a length corresponding to the desired mesh extension adjacent the first surface. At this point at least one mesh rung is created. This is done by generating facets between the two external mesh vertices using first and second extension vectors, wherein the first extension vector has a pre-determined spatial relationship to the first guide curve. Therefore, the first extension vector is guided by the guide curve, and the second extension vector is unguided.

The method may also include defining a second guide curve located at the boundary of the second surface for a length corresponding to the desired mixed sheet extension adjacent the second surface, wherein the second extension vector has a pre-determined spatial relationship to the second guide curve. The first extension vector may lie at an angle $\alpha$ to the first guide curve, and the second extension vector may lie at an angle $\beta$ to the second guide curve. The directions of the first and second extension vectors are guided by the first and second guide curves, respectively. This enables a constrained (or unconstrained, depending on the values of $\alpha$ and $\gamma$) mesh to be created for the length of the first and second geometry surfaces.

Figure 1:
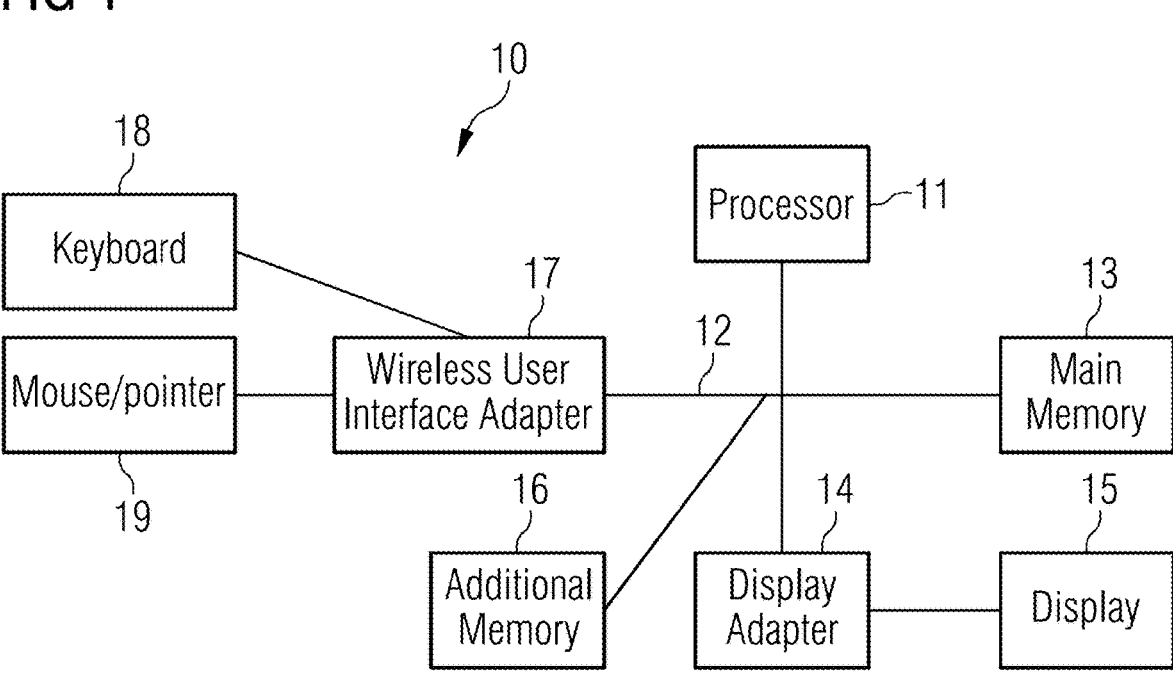
FIG. 1 illustrates an example of a data processing system in which embodiments may be implemented.

FIG. 1 illustrates an example of a data processing system in which an embodiment of the present disclosure may be implemented, for example, a CAD system configured to perform processes as described herein. The data processing system 10 includes a processor 11 connected to a local system bus 12. The local system bus connects the processor to a main memory 13 and graphics display adaptor 14, which may be connected to a display 15. The data processing system may communicate with other systems via a wireless user interface adapter connected to the local system bus 12, or via a wired network, e.g., to a local area network. Additional memory 16 may also be connected via the local system bus. A suitable adaptor, (e.g., a wireless user interface adapter 17), for other peripheral devices, (e.g., a keyboard 18, mouse 19, or other pointing device), allows the user to provide input to the data processing system. Other peripheral devices may include one or more I/O controllers such as USB controllers, Bluetooth controllers, and/or dedicated audio controllers (connected to speakers and/or microphones). Various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further, many devices referred to as input devices or output devices may both provide inputs and receive outputs of communications with the data processing system. Further, other peripheral hardware connected to the I/O controllers may include any type of device, machine, or component that is configured to communicate with a data processing system.

An operating system included in the data processing system enables an output from the system to be displayed to the user on display 15 and the user to interact with the system. Examples of operating systems that may be used in a data processing system may include Microsoft Windows™, Linux™, UNIX™, iOS™, and Android™ operating systems.

In addition, data processing system 10 may be implemented as in a networked environment, distributed system environment, virtual machines in a virtual machine architecture, and/or cloud environment. For example, the processor 11 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 10 may vary for particular implementations. For example, the data processing system 10 in this example may correspond to a computer, workstation, and/or a server. However, alternative embodiments of a data processing system may be configured with corresponding or alternative components such as in the form of a mobile phone, tablet, controller board, or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 10 may be connected to the network (not a part of data processing system 10), which may be any public or private data processing system network or combination of networks, as known to those of skill in the art, including the Internet. Data processing system 10 may communicate over the network with one or more other data processing systems such as a server (also not part of the data processing system 10). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Figure 2:
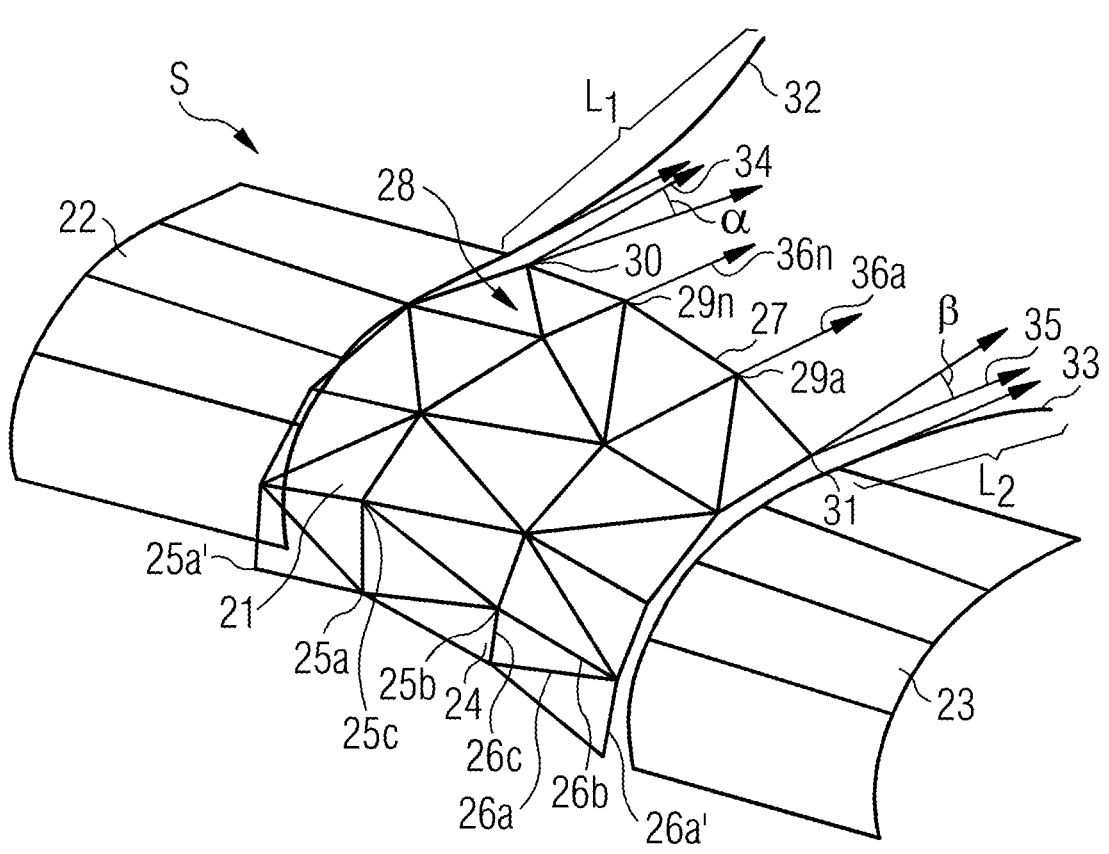
FIG. 2 is a schematic illustration of a mixed sheet to be extended in accordance with an embodiment.

FIG. 2 is a schematic illustration of a sheet to be extended in accordance with an embodiment. This illustrates the situation where a mixed sheet S including a mesh 21, a first surface 22 and a second surface 23, where the first surface 22 and/or the second surface 23 has a different geometry to the mesh 21. In this example, both the first surface 22 and second surface 23 are classical geometry surfaces. The mesh 21 includes a plurality of regular polygonal facets. In this example, triangular facets 24 are shown. Each triangular facet 24 includes three mesh vertices (mvertices) 25a, 25b, 25c joined together by three mesh fins (mfins) 26a, 26b, 26c, forming the boundary of the triangular facet 24. Two triangular facets 24 in the mesh meet along two coincident mesh fins 26a, 26b, 26c (one from each triangular facet 24) or at a shared mesh vertex (25a, 25b, 25c). A mesh fin 26a, 26b, 26c with no coincident neighbor is termed a laminar mesh vertex 26a', 26b', 26c' and lies along edge of the mesh 21. A laminar mesh vertex 25a', 25', 25c' is a mesh vertex 25a, 25b, 25c having laminar mesh fins 26a', 26b', 26c' on the edge of the mesh 21. The mesh boundary 27 to be extended also includes laminar mesh vertices and laminar mesh fins and lies along the edge of the mesh 21 where a rung will be generated. The mesh 21 is formed from a number of rows 28 (in the example shown, four) where each row 28 includes n facets 24 separated by n−1 interior vertices 29a . . . 29n. A first exterior vertex 30 lies adjacent to the first surface 22 and a second exterior vertex 31 lies adjacent to the second surface 23. The mesh 21 is therefore located between the first exterior vertex 30 and second exterior vertex 31.

A first guide curve 32 is generated at the boundary of the first surface 22, for a length $L_1$ corresponding to the desired mixed sheet extension. A second guide curve 33 is generated at the boundary of the second surface 23, for a length L2 corresponding to the desired mixed sheet extension. In FIG. 2, the first guide curve 32 rotates counter-clockwise away from the first exterior vertex 30, and the second guide curve 33 rotates clockwise away from the second exterior vertex 31. Each of the first exterior vertex 30 and second exterior vertex 31 is extended by a first extension vector 34 and a second extension vector 35, each of which has a predetermined spatial relationship to the first guide curve 32 and second guide curve 33, respectively. The first extension vector 34 lies at an angle α to a tangent of the first guide curve 32, and the second extension vector 35 lies at an angle β to a tangent of the second guide curve 32. Each of the first extension vector 34 and second extension vector 35 therefore has a pre-determined spatial relationship with its corresponding guide curve 32, 33. Therefore, a guided extension vector G will extend at the angle α or β along the respective guide curve, parallel to the tangent, for values of α and β=0°, and an unguided extension vector U will extend at non-zero angles. Within the mesh 21, the interior vertices 29a . . . 29n are extended by corresponding interpolated extension vectors 36a . . . 36n. Each interpolated extension vector 36a . . . 36n may also be guided or unguided. When guided, the interpolated extension vector 36a . . . 36n proceeds at an angle to a normal from its corresponding mesh vertex that is a weighted average of the angles α and β. The weighting may be determined by the distance that the interpolated extension vector 36a . . . 36n lies from the first extension vector 34 and second extension vector 35. For example, in FIG. 2 two interpolated extension vectors 36a, 36b are shown, where an appropriate weighting may be ⅓β:⅔α for that closest to the first extension vector 34 and ⅓α:⅔β for that closest to the second extension vector 35. Extending the mixed sheet S therefore requires the generation of triangular facets 24 along the first extension vector 34 and second extension vector 35 as well as along the interpolated extension vectors 36a . . . 36n, either at the same time that the first surface 22 and second surface 23 are extended (in the case of a mixed sheet extend operation) or subsequent to the time that the first surface 22 and second surface 23 are extended (in the case of a face delete operation). The facets 24 may be generated using any of the methods known in the art. The first surface 22 and the second surface 23 are both shown in FIG. 2 as generic B-rep surfaces. A common use of the method 100 is to extend a mixed sheet where both the first external mesh vertex 30 and second external mesh vertex 31 are adjacent a surface that has a different geometry to the mesh 21. However, the method 100 may also be used where only one of the first external mesh vertex 30 or second external mesh vertex 31 is adjacent a surface that has a different geometry to the mesh 21, with the other of the two surfaces also being a mesh of the same construction as the mesh 21.

Figure 3:
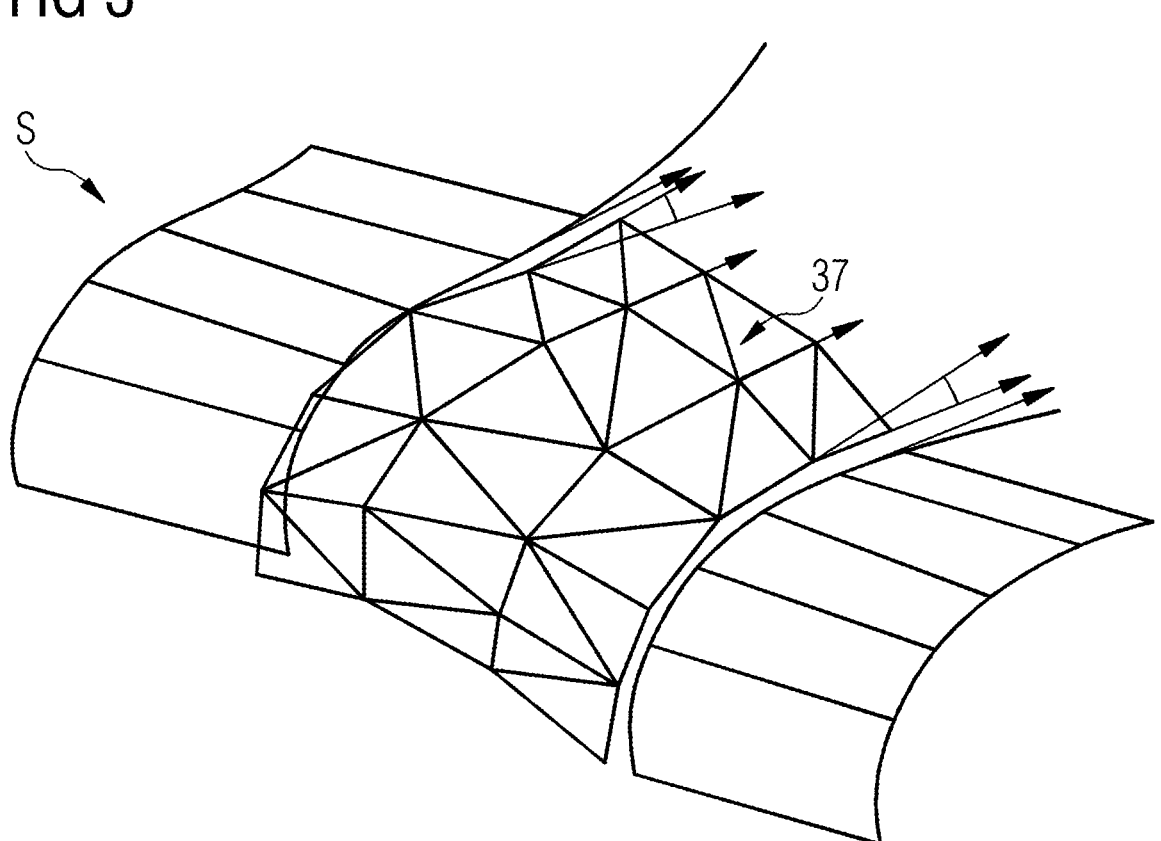
FIG. 3 is a schematic illustration of a partially extended mixed sheet created using a method in accordance with an embodiment.

FIG. 3 is a schematic illustration of a partially extended mixed sheet created using a method in accordance with an embodiment. In comparison with FIG. 2, a mesh extension rung has been added to the mesh 21. The role of the rung is to aid in extending the mixed sheet S by allowing a blending function to interpolate between the tangent to the first guide curve 31 and a tangent to the second guide curve 32 to generate the first extension vector 34 and second extension vector 35 and the interpolated extension vectors 36a . . . 36n. The number of mesh extension rungs required to carry out the entire mixed sheet S extension may be determined quantitatively or qualitatively. A quantitative determination requires the setting of a pre-determined tolerance threshold, representing an acceptable distance between either the first surface 22 or second surface 23 and the first guide curve 32 or second guide curve 33. At each point the threshold is exceeded, a new mesh extension rung is initiated. This requires calculation of the threshold along the entire lengths L1, L2 of the first guide curves 32 and second guide curve 33 before the extension of the mixed sheet S is initiated. A qualitative determination requires that the quality of the mesh 21 is preserved for the entire mixed sheet S extend. The quality of a mesh may be determined in different ways, but in general relates to the regularity of the polygon facets making up the mesh. A "good" quality mesh is one where the lengths of the mesh fins of a facet are close to equal, or where the angles at the mesh vertices of the facet are close to equal. For a triangular mesh, an equilateral triangle may be an ideal facet, therefore a "good" triangular mesh may include facets formed of equilateral triangles. A "poor" quality mesh is one where there is a considerable mismatch between the lengths of the mesh fins and/or the angles at the mesh vertices. Again, taking the case of a triangular mesh, a mesh formed from isosceles triangles could be considered "poor." The number of mesh extension rungs may therefore be determined by dividing the lengths $L_1$, $L_2$ of the first guide curve 32 and second guide curve 33 into a number of mesh extension rungs that will aid in generating facets 24 that result in a new mesh of the same, or as similar as possible, quality as the mesh 21.

Figure 4:
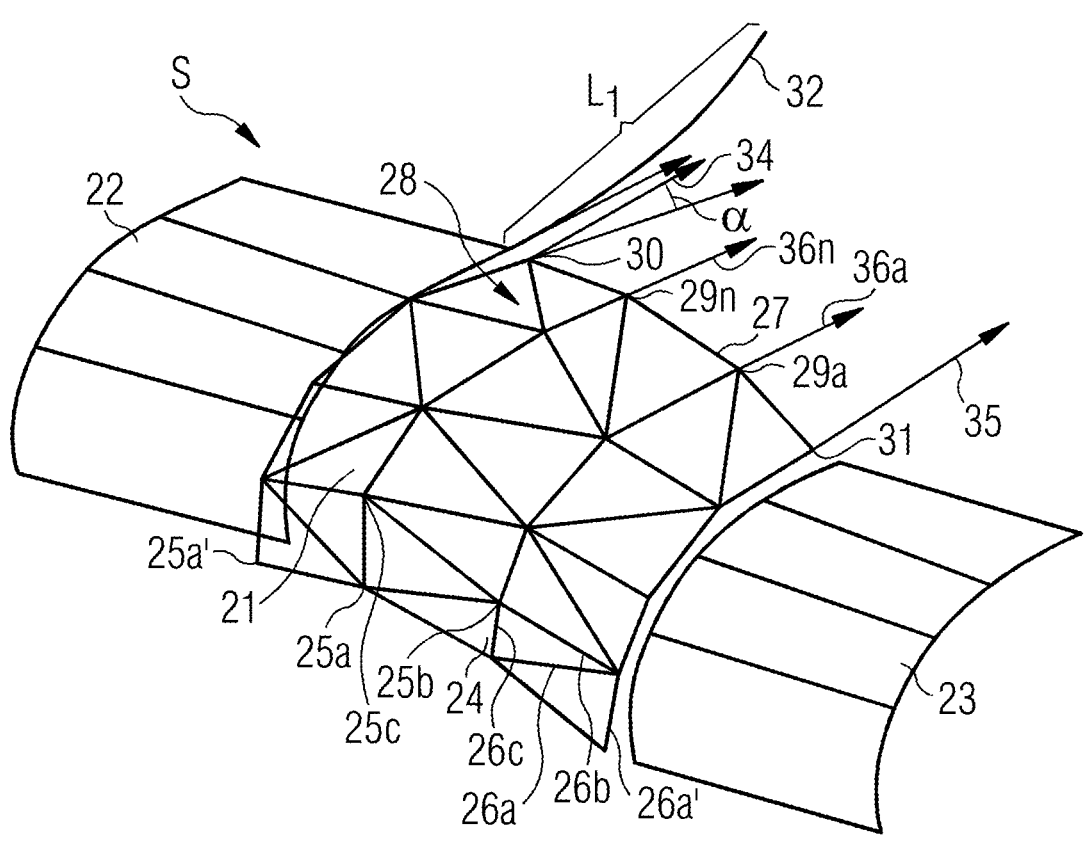
FIG. 4 is a schematic illustration of a mixed sheet to be extended in accordance with another embodiment.

FIG. 4 is a schematic illustration of a sheet to be extended in accordance with another embodiment. This illustrates the simplest case where only one guide curve 32 is used, such that the first extension vector 34 is guided and the second extension vector 35 is unguided during the creation of the rung 37. In comparison with FIG. 2, the second guide curve 33 and angle β to the tangent of the second guide curve 33 are absent. The second extension vector 35 extends from the second external vertex 31 without constraint, in a similar manner to the internal extension vectors 36*a* . . . 36*n*.

Figure 5:
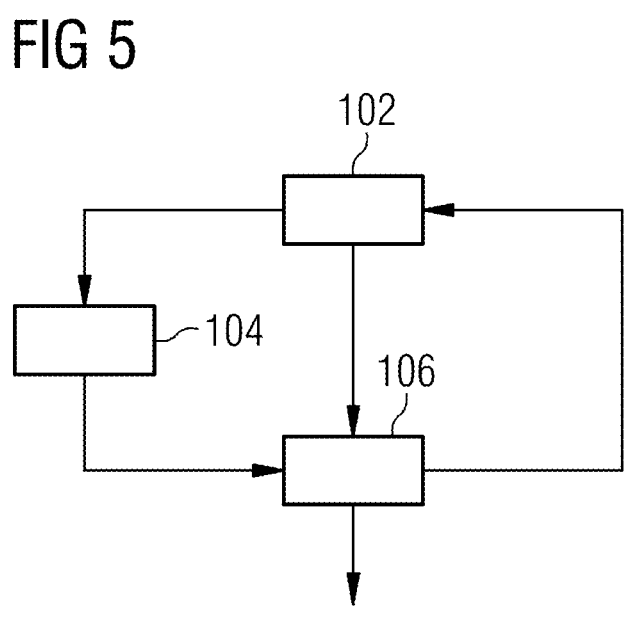

The manner in which a mixed sheet Sis extended is described below. FIG. 5 is a flow chart illustrating a method of extending a mixed sheet in accordance with the embodiments. Initially, the embodiments of the method may be used to create rungs where only one guide curve 32 is present, such that only the first extension vector 34 is guided. This may then be expanded by adding an additional act to define a second guide curve 33 to enable the guiding of the second extension vector 35. This may also, although not necessarily, correspond to a situation where only one of the first external mesh vertex 30 or second external mesh vertex 31 is adjacent to a surface with a different geometry to the mesh 21. The method 100 takes place in a data processing system, such as that described with respect to FIG. 1, with respect to a mixed-geometry model. A computer program containing instructions, which when compiled on a computer, cause the computer to carry out the method 100 may be used in conjunction with the data system 1. Initially, at act 102, a first guide curve 32 is defined, located at the boundary 27 of the first surface 22 for a length L1 corresponding to the desired mixed sheet S extension adjacent the first surface 22.

At act 104, at least one extension mesh rung is created. This is done by generating facets 24 between the first external mesh vertex 30 and second external mesh vertex 31 using a first extension vector 34 and second extension vector 35. The first extension 34 vector has a pre-determined spatial relationship to the first guide curve. At each mesh extension rung 37, there is a first extension vector 34 tangent to the first guide curve 32, and a second extension vector 35 co-incident with the second external mesh vertex 31. The first extension vector 34 is therefore guided by the first guide curve 32, whilst the second extension vector 35 is unguided. At each interior mesh vertex 29*a* . . . 29*n*, there is an unguided interpolated extension vector 36*a* . . . 36*n*, along which the mesh 21 may extend if it were unconstrained.

In order to constrain both the first extension vector 34 and the second extension vector 35, an additional act is included in the method 100 in order to generate the second guide curve 33. At act 106, the second guide curve 33 is defined, located at the boundary 27 of the second surface 23 for a length L2 corresponding to the desired mixed sheet S extension adjacent the second surface 23. The generation of the facets 34 to create the rung 37 then proceeds by act 104, generating facets between the first external mesh v vertex 30 and second external mesh vertex 31 using first extension vector 34 and second extension vector 35. This time, however, not only does the first extension vector 34 have a pre-determined spatial relationship to the first guide curve 32, but the second extension vector 35 also has a pre-determined spatial relationship to the second guide curve 33. The first guide curve 32 and second guide curve 33 may be defined in a number of different ways. For example, a guide curve 32, 33 may be an extension of a curve that defines the boundary of the neighboring face, which for a B-rep surface face, may be an extension of the sp-curve defining the boundary of the neighboring B-rep surface face. For a swept or spun neighboring face, the path of the face may be extended. Lines defining the rulings of a neighboring ruled-surface face may also be used. Where the neighboring face is an analytic surface, analytic curves lying on the surface may be used, such as lines on a planar or cylindrical face, or circular arcs on a curved or toroid face. It may be desirable to us an intersection between an extension of the neighboring surface and an auxiliary surface, such as a plane that is orthogonal to the laminar boundary of a classic geometry face where it meets the mesh.

As discussed above with respect to FIG. 2, a guided interpolated extension vector 36*a* . . . 36*n* takes a weighting determined by its distance from the first extension vector 34 and second extension vector 35. The guided interpolated extension vectors 36*a* . . . 36*n* are constructed by a blending function that begins at the first guide curve 32 and interpolates the extension vectors 36*a* . . . 36*n* in order until the second guide curve 3 is reached. The blending function takes into account the rotation between the unguided first extension vector 34 and the tangent to the first guide curve 32, and the rotation between the unguided second extension vector 35 and the tangent to the second guide curve 33. Alternatively, if both the first extension vector 34 and second extension vector 35 are unguided the interpolated extension vectors 36*a* . . . 36*n* may have their direction determined by the direction of the interior vertex 19*a* . . . 19*n* they correspond to. As may be seen in FIG. 3, the extension vectors 34, 35, 36*a* . . . 36*n* are constructed to create extending mesh fins 26*a*, 26*b*, 26*c* at each laminar mesh vertex 25*a'*, 25*b'*, 25*c'*, based upon the boundary mesh fins (those laying along the boundary 27 between the mesh 21 and each alternative geometry surface 22, 23), facets and normals. This results in the extension of the mixed sheet S being determined by the mesh 21.

To create further mesh extension rungs 37, the process in acts 102 and 104, and optionally act 106, is repeated until the extension of the mixed sheet S is complete. At this point, it may be desirable to carry out any acts required to make the interfaces between the mesh 21 and the alternative geometry surfaces 22, 23 at the boundary 27 align as closely as possible. In either case, the method 100 enables the extension of the mixed sheet S in such a way that the extension of the mesh 21 remains within an acceptable tolerance of the extension of the adjacent first surface 22 and second surface 23 (the extended faces meet each other within a given edge tolerance tube in the extended region).

Figure 6:
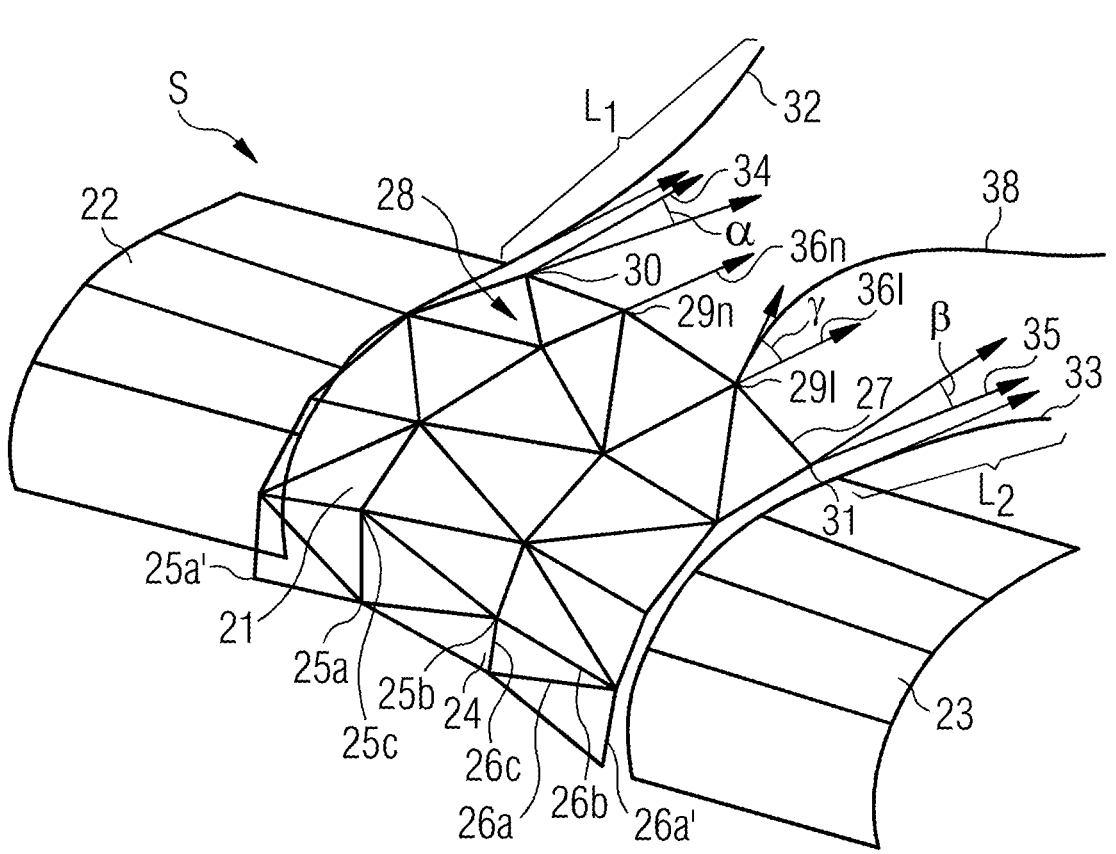
FIG. 6 is a schematic illustration of a mixed sheet to be extended in accordance with an embodiment.

FIG. 6 is a schematic illustration of a mixed sheet to be extended in accordance with an embodiment. This represents an alternative approach to using a weighting of first extension vector 34 and second extension vector 35 angles α, B to determine the direction of at least one of the interpolated extension vectors 36*i*. A third guide curve 38 is provided at an interior mesh vertex 29*i*, which has a tangent at an angle Y to the direction of the interior mesh vertex 29*i*. Consequently, it is possible to represent creases in the mesh 21 as part of the extension of the mixed sheet S where the interpolated extension vector 36*i* is guided for non-zero values of γ. Similar to the first 32 and second 33 guide curves, if the angle γ is 0°, the interpolated extension vector 36*i* is guided.

While in the examples above the mixed sheet S is extended as part of a sheet extend operation, conversely the technique may be used as part of a face delete operation. In this situation, a face within a model is deleted, and the method 100 is used to provide a mesh 21 replacement for the deleted face. In the examples, the first surface 22 and second surface 23 are both classical geometry surfaces, such as parameterized or implicit geometry surfaces. One example of these is a B-rep surface. Alternatively, the first surface 22 and/or the second surface 23 may be meshes having a different regular polygonal structure to the mesh 21. For example, in the examples above, the mesh 21 is a triangular mesh, but the first surface 22 may in fact be a rectangular mesh. For situations where only one of the first external mesh vertex 30 or second external mesh vertex 31 is adjacent to a surface having a different geometry to the mesh 21, the other surface may be a mesh having the same geometry or polygonal construction as the mesh 21 being extended.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of extending a mixed sheet comprising at least one mesh and one alternative geometry surface in a mixed-geometry model, wherein a mesh boundary to be extended comprises a row of n facets separated by n–1 interior vertices and located between two external mesh vertices, and wherein one or both of the external mesh vertices is adjacent to a surface having a different geometry to the mesh, the method comprising:
    defining a first guide curve located at a boundary of a first surface for a length corresponding to a desired mixed sheet extension adjacent the first surface; and
    creating at least one extension mesh rung by generating facets between the two external mesh vertices using a first extension vector and a second extension vector, wherein the first extension vector has a pre-determined spatial relationship to the first guide curve.

2. The method of claim 1, wherein the mixed sheet is extended as part of a sheet extend operation.

3. The method of claim 1, wherein the mixed sheet is extended as part of a face delete operation.

4. The method of claim 1, wherein both a first external mesh vertex and a second external mesh vertex of the two external mesh vertices are adjacent to a surface having a different geometry to the mesh.

5. The method of claim 1, wherein the first surface is a classical geometry surface.

6. The method of claim 1, wherein the mesh comprises facets having a first regular polygonal shape, and
    wherein the first surface comprises a mesh of facets having a second polygonal shape that is different from the first regular polygonal shape.

7. A computer-implemented method of extending a mixed sheet comprising a mesh and one alternative geometry surface in a mixed-geometry model, wherein a mesh boundary to be extended comprises a row of n facets separated by n–1 interior vertices and located between two external mesh vertices, and wherein one or both of the external mesh vertices is adjacent to a surface having a different geometry to the mesh, the method comprising:
    defining a first guide curve located at a boundary of a first surface for a length corresponding to a desired mixed sheet extension adjacent the first surface;
    defining a second guide curve located at a boundary of a second surface for a length corresponding to a desired mixed sheet extension adjacent the second surface; and
    creating at least one extension mesh rung by generating facets between the two external mesh vertices using a first extension vector and a second extension vector, wherein the first extension vector has a pre-determined spatial relationship to the first guide curve, and wherein the second extension vector has a pre-determined spatial relationship to the second guide curve.

8. The method of claim 7, wherein the pre-determined spatial relationship comprises the first extension vector laying at an angle α to a tangent of the first guide curve and the second extension vector laying at an angle β to a tangent of the second guide curve, and
    wherein directions of the first extension vector and the second extension vector are guided by the first and second guide curves, respectively.

9. The method of claim 8, wherein the n–1 interior vertices are extended along the at least one extension mesh rung by n–1 interpolated mesh vectors,
    wherein facets are generated along the interpolated mesh vectors, and
    wherein an angle of each interpolated mesh vector to a corresponding interior vertex of the respective interpolated mesh vector is a weighted average of α and β.

10. The method of claim 9, wherein the weighted average is determined by a distance of an interpolated extension vector from each of the first extension vector and the second extension vector.

11. The method of claim 8, wherein either α=0° or β=0° such that the first extension vector and the second extension vector are guided by the first guide curve and the second guide curve, respectively.

12. The method of claim 8, wherein at least a third guide curve is provided at one of the interior vertices, and
    wherein the corresponding interpolated extension vector lies at an angle γ to a tangent of the third guide curve.

13. The method of claim 7, wherein the first guide curve and the second guide curve are divided into an equal number of rungs.

14. The method of claim 13, wherein the number of rungs is determined by a quality of the mesh.

15. The method of claim 14, wherein the number of rungs is determined by a pre-determined tolerance between the first extension vector and the first guide curve and a pre-determined tolerance between the second extension vector and the second guide curve.

16. The method of claim 7, wherein the first surface and the second surface are classical geometry surfaces.

17. The method of claim 7, wherein the mesh comprises facets having a first regular polygonal shape, and
    wherein the first surface and the second surface comprise a mesh of facets having a second polygonal shape that is different from the first regular polygonal shape.

18. A non-transitory computer readable medium comprising a computer program containing instructions, which, when compiled on a computer, cause the computer to:

define a first guide curve located at a boundary of a first surface for a length corresponding to a desired mixed sheet extension adjacent the first surface for a mixed sheet comprising at least one mesh and one alternative geometry surface in a mixed-geometry model, wherein a mesh boundary comprises a row of n facets separated by n−1 interior vertices and located between two external mesh vertices, and wherein one or both of the external mesh vertices is adjacent to a surface having a different geometry to the mesh; and create at least one extension mesh rung by generating facets between the two external mesh vertices using a first extension vector and a second extension vector, wherein the first extension vector has a pre-determined spatial relationship to the first guide curve.

\* \* \* \* \*